United States Patent [19]

Kanno et al.

[11] Patent Number: 4,864,995
[45] Date of Patent: Sep. 12, 1989

[54] SYSTEM FOR CONTROLLING IGNITION TIMING IN INTERNAL COMBUSTION ENGINE

[75] Inventors: Yoshiaki Kanno; Jiro Sumitani, both of Himeji, Japan

[73] Assignee: Mitsubishi Denki Kabushiki Kaisha, Tokyo, Japan

[21] Appl. No.: 192,628

[22] Filed: May 11, 1988

[30] Foreign Application Priority Data

| May 12, 1987 | [JP] | Japan | 62-115383 |
| May 12, 1987 | [JP] | Japan | 62-115384 |
| May 12, 1987 | [JP] | Japan | 62-115385 |
| May 12, 1987 | [JP] | Japan | 62-115386 |

[51] Int. Cl.$^4$ .......................... F02P 5/15; F02D 43/04
[52] U.S. Cl. ..................... 123/422; 123/417; 123/418
[58] Field of Search ............... 123/416, 417, 418, 422, 123/423, 494

[56] References Cited

U.S. PATENT DOCUMENTS

| 4,256,073 | 3/1981 | Kobashi et al. | 123/422 |
| 4,391,250 | 7/1983 | Matsui | 123/438 |
| 4,506,639 | 3/1985 | Murakami et al. | 123/418 X |
| 4,658,789 | 4/1987 | Morita | 123/422 |
| 4,710,881 | 12/1987 | Mouri et al. | 123/422 X |
| 4,809,664 | 3/1989 | Nakamoto et al. | 123/425 X |

FOREIGN PATENT DOCUMENTS

| 3436907 | 4/1986 | Fed. Rep. of Germany . |
| 0162365 | 9/1984 | Japan | 123/422 |
| 0045832 | 11/1984 | Japan . |
| 2191539 | 12/1987 | United Kingdom | 123/423 |

OTHER PUBLICATIONS

Steuerung der Einspritzung und Zundung Von Ottomotoren mit Hilfe der Digitalen Motorelektronik Motronic, Bosch Techn. Berichte 7, Mar. 1981, pp. 139-151.

*Primary Examiner*—Willis R. Wolfe
*Attorney, Agent, or Firm*—Oblon, Spivak, McClelland, Maier & Neustadt

[57] ABSTRACT

Ignition timing control system for an internal combustion engine which is constructed with an intake air quantity detecting device for detecting a quantity of air taken into the internal combustion engine, an engine revolution detecting device for detecting number of revolution of the engine, an An detecting device for calculating an output from the intake air quantity detecting device between predetermined crang angles, a correcting device for correcting an output from the engine revolution detecting device at the transition of the engine revolution, and a control device for controlling the ignition timing of the engine based on the outputs from the engine revolution detecting device and the correcting device.

5 Claims, 18 Drawing Sheets

FIGURE 9

|  | N0 | N1 | N2 | N3 |  |
|---|---|---|---|---|---|
| ANs0 | A00 | A01 | A02 | A03 | ------ |
| ANs1 | A10 | A11 | A12 | A13 | ------ |
| ANs2 | A20 | A21 | A22 | A23 | ------ |

|  | Ne0 | Ne1 | Ne2 | Ne3 |  |
|---|---|---|---|---|---|
| ANs0 | A00 | A01 | A02 | A03 | ------ |
| ANs1 | A10 | A11 | A12 | A13 | ------ |
| ANs2 | A20 | A21 | A22 | A23 | ------ |
|  | │ | │ | │ | │ |  |

SYSTEM FOR CONTROLLING IGNITION TIMING IN INTERNAL COMBUSTION ENGINE

BACKGROUND OF THE INVENTION

1. Field of the Invention

This invention relates to a system for controlling the ignition timing in an internal combustion engine, and, more particularly, it is concerned with an ignition timing control system for an internal combustion engine, which is capable of detecting a quantity of intake air into the combustion engine by means of an intake air quantity sensor, and controlling the ignition timing of the internal combustion engine based on the output as detected by the intake air quantity sensor and the number of revolution of the engine.

2. Discussion of Background

It has so far been a practice that, when the ignition timing of internal combustion engine is to be controlled, the intake air quantity sensor or air flow sensor (hereinafter abbreviated as "AFS") is disposed upstream the throttle valve, and, on the basis of an intake air quantity A/N (also abbreviated as "AN") per single suction of the engine as calculated from an output of this AFS and the number of revolution of the engine, the ignition timing of the internal combustion engine is controlled.

With the above-mentioned conventional control system, however, there was a point of problem such that the ignition timing shifts to the side of the advance angle of the engine by its demand, thereby causing the engine knocking, because of delay in processing of the arithmetic operations for the intake air quantity A/N at the transition of the engine revolution, e.g., at the time of speed acceleration, or detection by AFS of the intake air quantity at a rate lower than its actual quantity.

SUMMARY OF THE INVENTION

It is therefore the primary object of the present invention to provide a control system which is capable of securing the accurate ignition timing of the internal combustion engine.

According to the present invention, in general aspect of it, there is provided an ignition timing control system which comprises in combustion: intake air quantity detecting means for detecting a quantity of air taken into an internal combustion engine; engine revolution detecting means for detecting number of revolution of the engine; AN detecting means for calculating an output from said intake air quantity detecting means between predetermined crank angles; correcting means for correcting an output from said engine revolution detecting means at the transition of the engine revolution; and control means for controlling the ignition timing of the engine based on the outputs from said engine revolution detecting means and said correcting means.

The foregoing object, other objects as well as the specific construction and operations of the ignition timing control system according to the present invention will become more apparent and understandable from the following detailed description thereof, when read in conjunction with the accompanying drawing.

BRIEF DESCRIPTION OF THE ACCOMPANYING DRAWING

Figure 8:
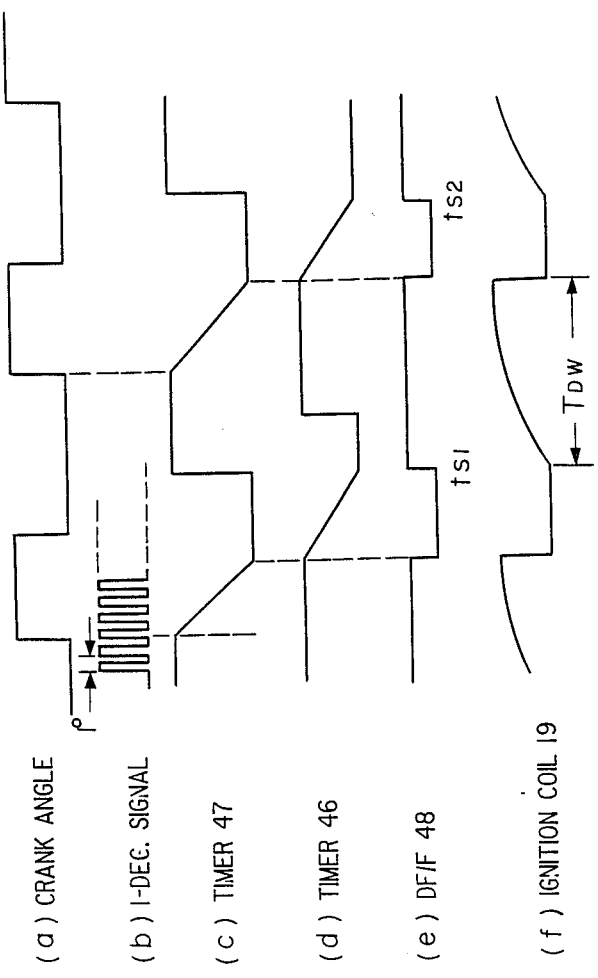
Figure 10:
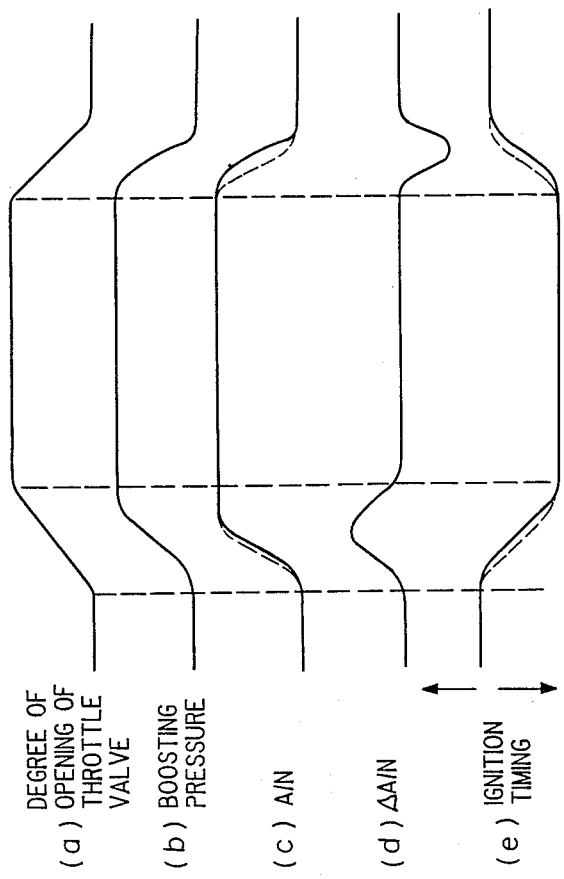
Figure 11:
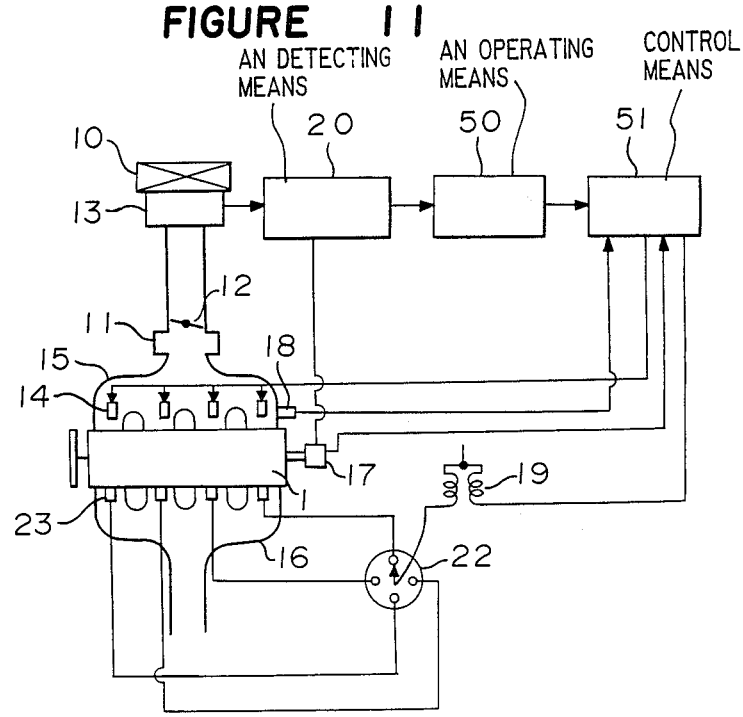
Figure 12:
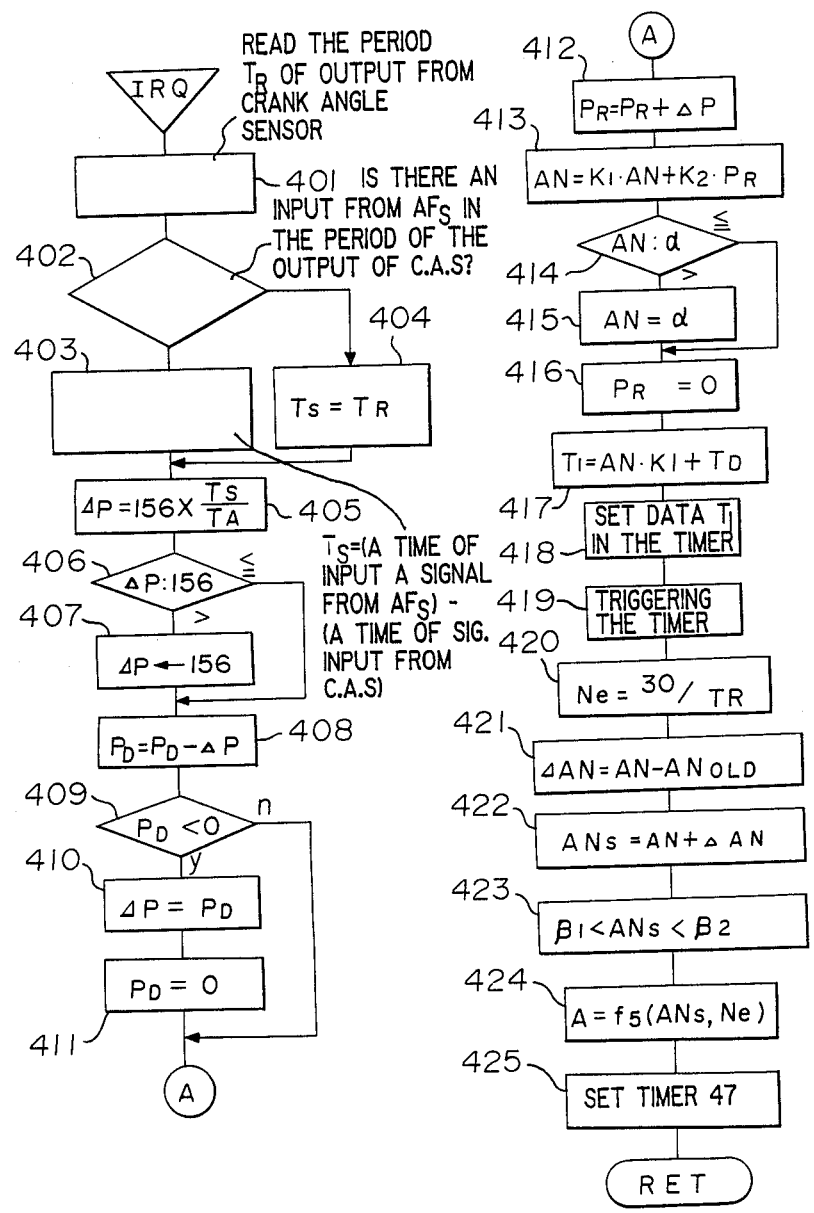
Figures 13, 14:
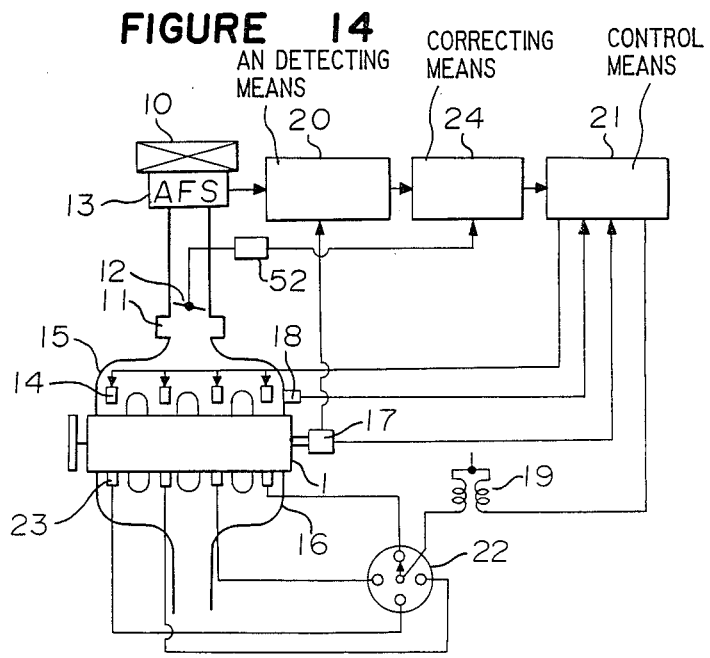
Figure 15:
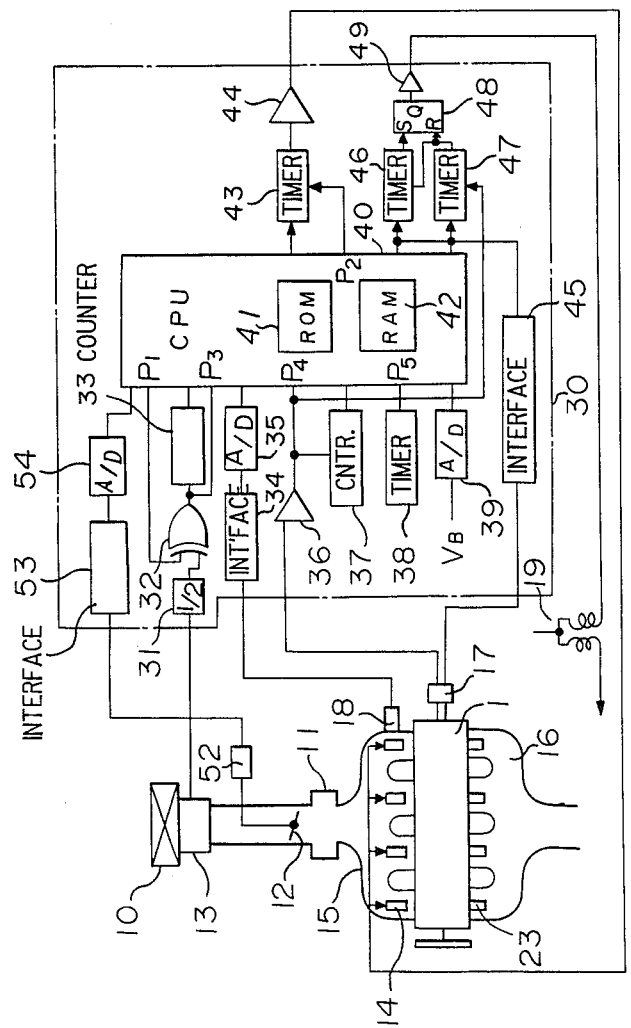
Figure 16:
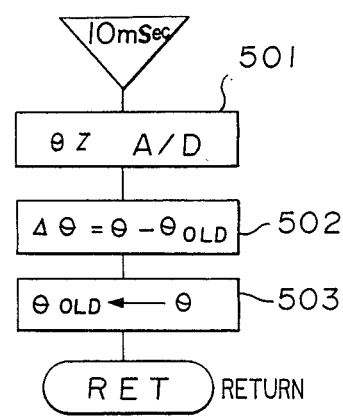
Figure 17:
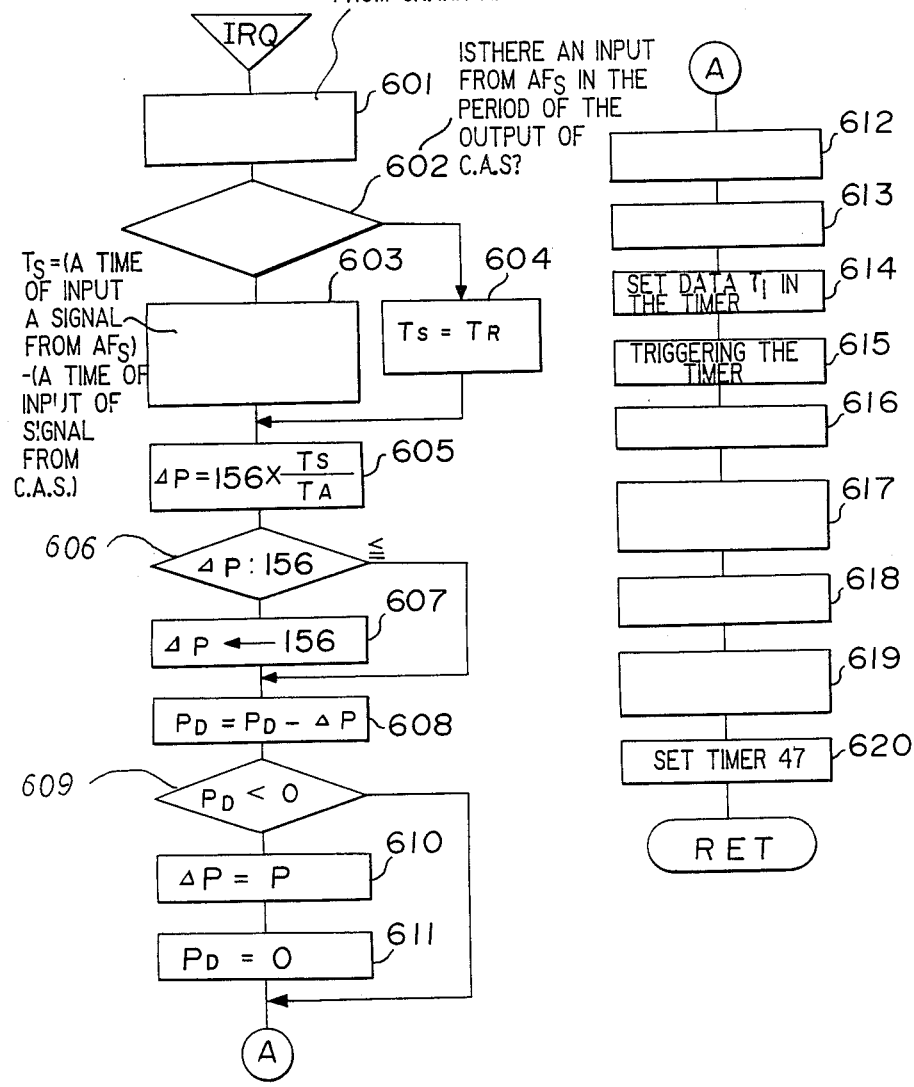
Figure 18:
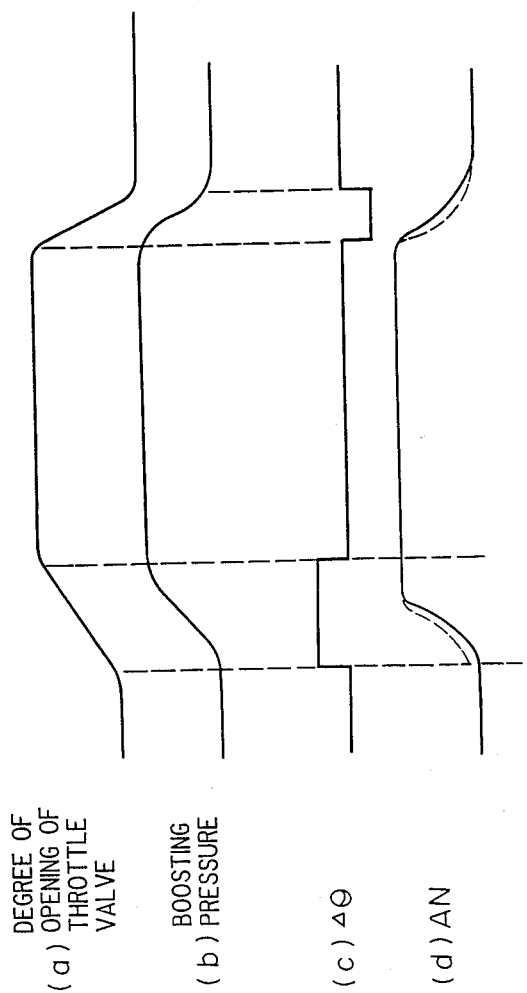
Figure 19:
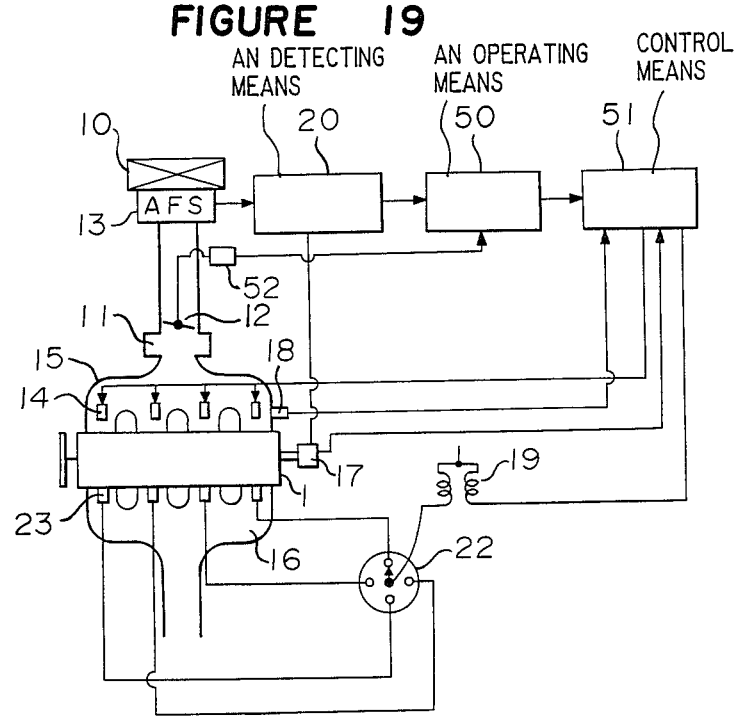
Figure 20:
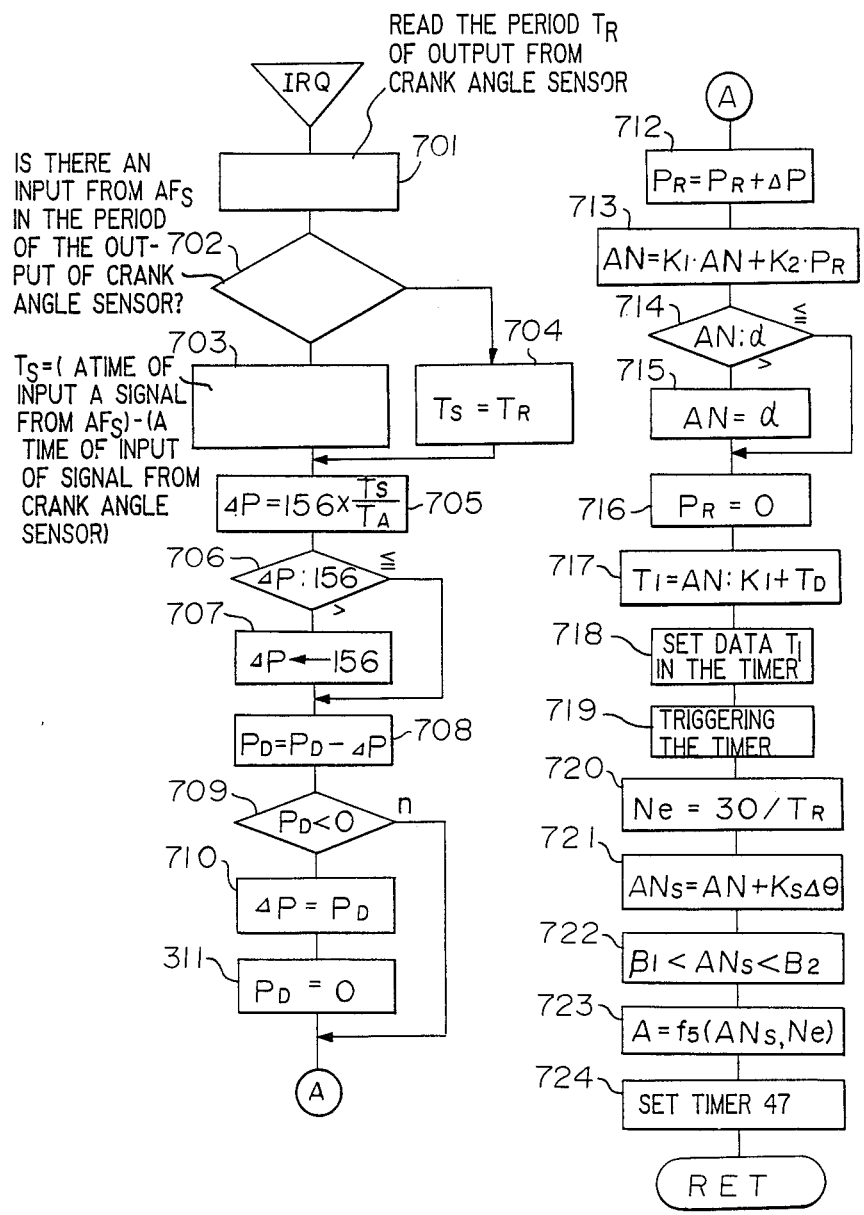
Figure 21:
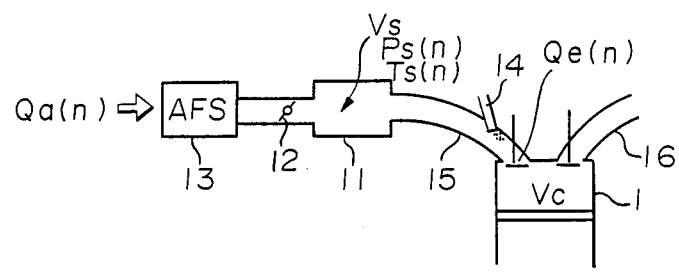
Figure 22:
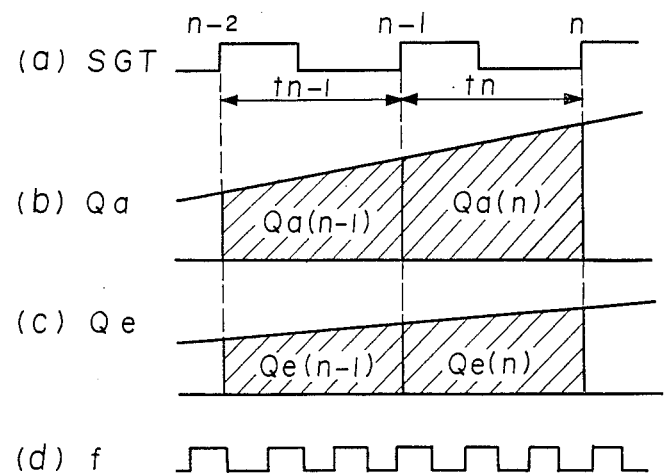

FIGS. 8, a–f are a timing chart showing various on-off operations of an ignition coil;

FIG. 9 is a map of the ignition timings as stored in ROM;

FIGS. 10, a–e are a diagram showing various operating waveforms for each of parameters at the transition of the engine revolution;

FIG. 11 is a schematic diagram showing a construction of the ignition timing control system according to the second embodiment of the present invention;

FIG. 12 is a flow chart showing the operations of the ignition timing control system for the internal combustion engine according to the second embodiment of the present invention;

FIG. 13 is a map of the ignition timings as stored in ROM;

FIG. 14 is a schematic diagram showing a construction of the ignition timing control system according to the third embodiment of the present invention;

FIG. 15 is a schematic structural diagram showing one practical embodiment of the ignition timing control system for the internal combustion engine;

FIGS. 16 and 17 are flow charts showing operations in the ignition timing control system for the internal combustion engine, according to the third embodiment of the present invention;

FIGS 18, a–d are a diagram showing various operating waveforms for each of parameters at the transition of the engine revolution;

FIG. 19 is a schematic structural diagram showing a construction of the ignition timing control system according to the fourth embodiment of the present invention;

FIG. 20 is a flow chart showing the operations of the ignition timing control system for the internal combustion engine, according to the fourth embodiment of the present invention;

FIG. 21 is a schematic diagram showing a model of an air intake system for the internal combustion engine according to the present invention; and FIGS. 22, a–d are diagram showing a relationship between a crank angle of the air intake system and an intake air quantity.

DETAILED DESCRIPTION OF PREFERRED EMBODIMENTS

In the following, preferred embodiments of the present invention will be described in detail in reference to the accompanying drawing.

Referring first to FIG. 21 which shows a model of an air intake system for an internal combustion engine, a reference numeral 1 designates an engine having a volume $V_c$ per one stroke. This air intake sytem sucks air into it through an AFS 13 which is a Karman's vortex type flow meter, a throttle valve 12, a surge tank 11 and air intake pipe 15, while fuel is fed thereinto through an injector 14. By the way, an internal space between the throttle valve 12 and the engine 1 has a volume of $V_s$. A numeral 16 refers to an exhaust pipe.

FIG. 22 indicates a relationship of an intake air quantity with respect to a predetermined crank angle of the engine 1, in which (a) indicates a predetermined crank angle of the engine 1 (hereinafter called "SGT"); (b) indicates an air quantity $Q_a$ passing through the AFS 13; (c) indicates an air quantity $Q_e$ which the engine 1 takes thereinto; and (d) indicates an output pulse f from the AFS 13. Also, a rising period of the SGT at its n-2 to n-1 timings is taken as $t_{n-1}$ and a rising period thereof at its n-1 to n timings is taken as $t_n$; further, an intake air quantity which passes through the AFS 13 during the periods of $t_{n-1}$ and $t_n$ is taken as $Q_{a(n-1)}$ and $Q_{a(n)}$, respectively, and the air quantity which the engine 1 sucks therein during the periods of $t_{n-1}$ and $t_n$ is taken as $Q_{e(n-1)}$ and $Q_{e(n)}$, respectively. Furthermore, an average pressure and an average intake temperature in the surge tank 11 during the periods of $t_{n-1}$ and $t_n$ are respectively taken as $P_{s(n-1)}$, $P_{s(n)}$ and $T_{s(n-1)}$, $T_{s(n)}$. Here, the intake air quantity $Q_{a(n-1)}$, for example, corresponds to the output pulse number of the AFS 13 during the period of $t_{n-1}$. Since the intake temperature is small in its changing rate, if it is taken that $T_{s(n-1)} \approx T_{s(n)}$, and that the charging efficiency of the engine 1 is made constant, the following relationship will be established:

$$P_{a(n-1)} \cdot V_c = Q_{e(n-1)} \cdot R \cdot T_{a(n)} \quad (1)$$

$$P_{a(n)} \cdot V_c = Q_{e(n)} \cdot R \cdot T_{a(n)} \quad (2)$$

(where: R is a constant). And, when an air quantity residing in both surge tank 11 and air intake pipe 15 during the period of $t_n$ is taken as $\Delta Q_{a(n)}$, the following equation will be established:

$$\Delta Q_{a(n)} = Q_{a(n)} - Q_{e(n)} = V_s \cdot \frac{1}{R \cdot T_s} \times (P_{a(n)} - P_{a(n-1)}) \quad (3)$$

From the above equations (1) to (3), the following equation will be derived:

$$Q_{e(n)} = \frac{1}{1 + \frac{V_c}{V_s}} \cdot Q_{e(n-1)} + \left(1 - \frac{1}{1 + \frac{V_c}{V_s}}\right) \cdot Q_{a(n)} \quad (4)$$

As the consequence, when the air quantity $Q_{a(n)}$ which the engine 1 takes thereinto during the period $t_n$ can be calculated from the above equation (4) on the basis of the air quantity $Q_{a(n)}$ passing through the AFS 13. Here, if $V_c = 0.5$ l and $V_s = 2.5$ l, $$Q_{e(n)} = 0.83 \times Q_{e(n-1)} + 0.17 \times Q_{a(n)} \quad (5)$$

Figure 1:
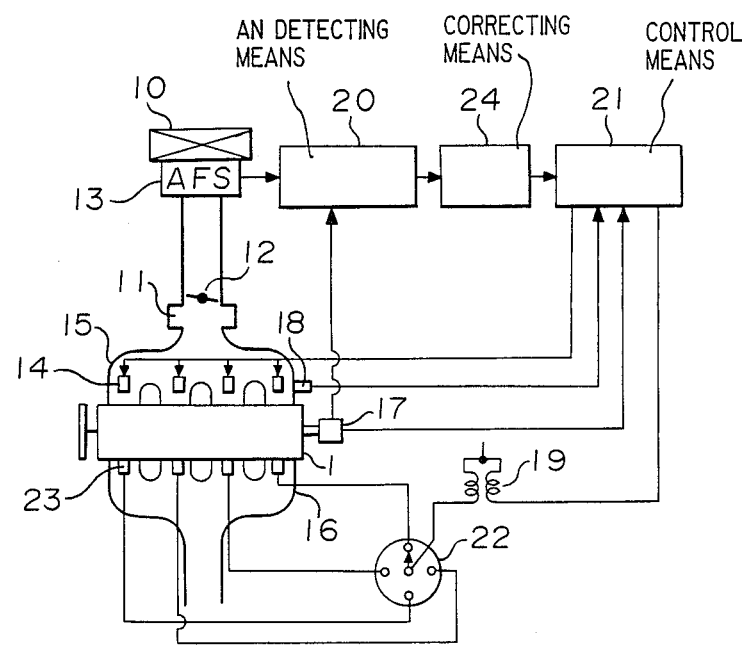
FIG. 1 is a schematic diagram showing a construction of the ignition timing control system according to the present invention.

In the following, the first embodiment of the present invention will be explained in reference to FIG. 1 of the accompanying drawing which shows schematically the construction of the ignition timing control system for the internal combustion engine. In the drawing, a numeral 1 refers to the engine, a reference numeral 10 designates an air cleaner disposed at the upstream side of a Karman's vortex type AFS 13, a numeral 11 refers to a surge tank, 12 denotes a throttle valve, 14 indicates injectors, 15 an air intake pipe, and 16 a discharge pipe.

The AFS 13 produces an output pulse as shown in FIG. 22(d) in accordance with the air quantity to be sucked in the engine 1, while a crank angle sensor 17 produces an output pulse as shown in FIG. 22(a)—for example, a crank angle from a rising of one pulse to another rising of the next pulse and having 180 degrees—in accordance with revolution of the engine 1. A reference numeral 20 designates AN detecting means which counts the output pulse number of AFS 13 to come in between predetermined crank angles of the engine 1 on the basis of the output from AFS 13 and the output from the crank angle sensor 17, and calculates the intake air quantity A/N per crank angle. A correcting means 24 corrects an output from the AN detecting means 20 in accordane with a changing rate of A/N. A control means 21 controls, by an output from the correcting means 24, an output from a water temperature sensor 18 (e.g., thermister) for detecting temperature of cooling water of the engine 1, and an output from the crank angle sensor 17 for detecting the number of revolution of the engine 1, a drive time of the injectors 14 and electric conduction through an ignition coil 19 in accordance with the intake air quantity which the engine 1 sucks, thereby regulating a quantity of fuel to be fed into the engine 1. Also, the ignition coil 19 carries out ignition by supplying an output voltage therefrom to an ignition plug 23 through a distributor 22.

Figure 2:
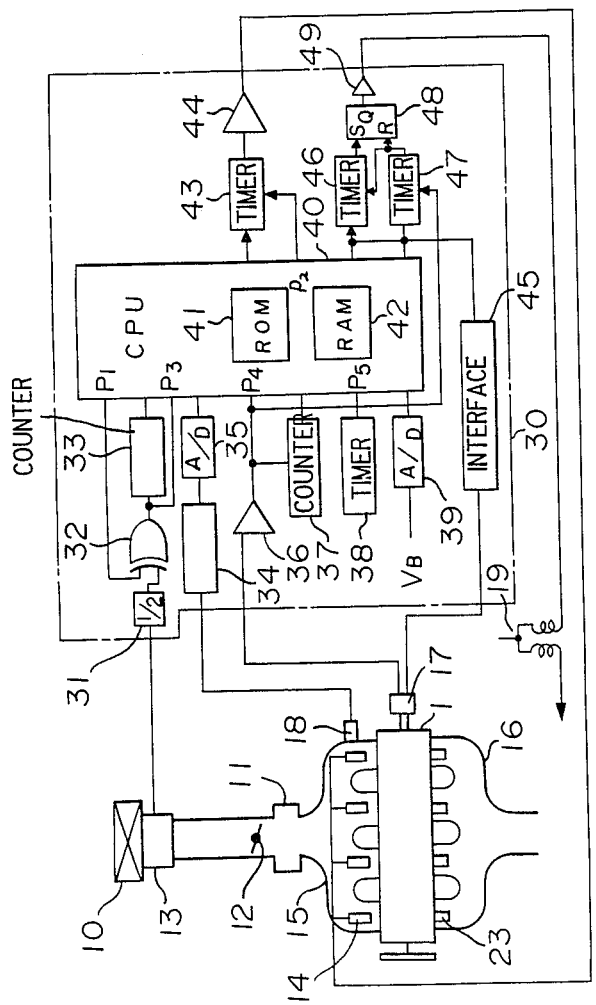
FIG. 2 is also a schematic structural diagram showing one practical embodiment of the ignition timing control system for an internal combustion engine.

FIG. 2 shows a more detailed construction of this first embodiment, wherein a reference numeral 30 designates a control device which controls four injectors 14 provided in each cylinder of the engine 1 and the ignition coil 19 with the output signals from the water temperature sensor 18 and the crank angle sensor 17 as the inputs thereto. This control device 30 corresponds to the AN detecting means 20, the correcting means 24 and the control means 21 shown in FIG. 1, and is realized by a micro-computer (hereinafter called "CPU") 40 comprising ROM 41 and RAM 42. A numeral 31 refers to an half frequency divider connected to the output side of the AFS 13; a reference numeral 32 designates an exclusive logic summation gate with the output side of the half frequency divider 31 as one of its input terminals, and with its other input terminal being connected to an output terminal P1 of the CPU 40, the output terminal thereof being connected to a counter 33 and an input terminal P3 of the CPU 40; a numeral 34 refers to an interface connected between the water temperature sensor 18 and an A/D converter 35; a numeral 36 refers to a waveform shaping circuit, into which an output from the crank angle sensor 17 is introduced as an input, while an output therefrom is introduced as an input into an interruption input terminal P4 of the CPU 40, a timer 47, and a counter 37; a numeral 38 refers to a timer connected to an interruption input terminal P5 of the CPU 40; a reference numeral 39 designates an A/D converter for effecting A/D conversion of a voltage of a battery (not shown in the drawing) and forwarding the thus converted voltage as an output into the CPU 40; a reference numeral 43 denotes a timer interposed between the CPU 40 and a driver 44, an output from the driver 44 being forwarded to each of the injectors 14; a numeral 45 refers to an interface, into which the output from the crank angle sensor 17 is introduced as an input thereinto, wherein a signal corresponding to 1 degree of the crank angle is introduced as an input into timers 46 and 47. An output from the timer 47 is introduced as an input into a reset terminal of the timer 46 and a D-F/F 48. Further, an output from the timer 46 is introduced as an input into a set terminal of the D-F/F 48. An output from the D-F/F 48 is introduced as an input into the ignition coil 19 through a driver 49. Furthermore, both timers 46 and 47 receive an output from the CPU 40 as an input thereinto.

In the following, explanations will be given as to the operations of the ignition timing control system of the above-described construction. The output from the AFS 13 is divided by the half frequency divider 31, and is introduced as an input into the counter 33 through the exclusive logic summation gate 32 which is controlled by the CPU 40. The counter 33 measured a period between the trailing edges of the output from the gate 32. The CPU 40 receives as an input into its interruption input terminal P3 the trailing part of the signal from the gate 32 and carries out the interruption processing at every output pulse period of the AFS 13 or at every half division of the output pulse period, thereby measuring the period of the counter 33. The output from the water temperature sensor 18 is converted to a voltage by means of the interface 34, and further converted by the A/D converter 35 into a digital value at every predetermined time to be taken into the CPU 40 thereby. The output from the crank angle sensor 17 is introduced as an input into the interruption input terminal P4 of the CPU 40, the timer 47, and the counter 37 through the waveform shaping circuit 36. The CPU 40 carries out the interruption processing at every rising of the output signal from the crank angle sensor 17 and detects a period between the risings of the output signal from the crank angle sensor 17 based on the output from the counter 37. The timer 38 generates an interruption signal into an interruption input terminal P5 of the CPU 40 at every predetermined time. The A/D conversion 39 carries out A/D conversion of a voltage of a battery (not shown in the drawing). The data of this battery voltage is introduced into the CPU 40 at every predetermined time. The timer 43 is preset by the CPU 40 and triggered from the output port P2 of the CPU 40 to produce an output having a predetermined pulse width. This output drives the injectors 14 through the driver 44. Also, the CPU 40 establishes an electric conduction angle $T_{DW}$ in the timer 46 and, at the same time, sets the ignition timing in the timer 47. As shown in FIG. 8, the timers 46, 47 count the signal having 1 degree of the crank angle to be outputted from the crank angle sensor 17, and, when it becomes zero, they forward the output signal to the D-F/F 48. The timer 47 starts its counting with rising of the crank angle and resets the D-F/F 48 when the crank angle becomes zero to thereby shut the current flow in the ignition coil 19. The timer 46 starts its count-down when the crank angle of the timer 47 becomes zero to set the D-F/F 48, thereby effecting electric conduction in the ignition coil 19.

Figure 3:
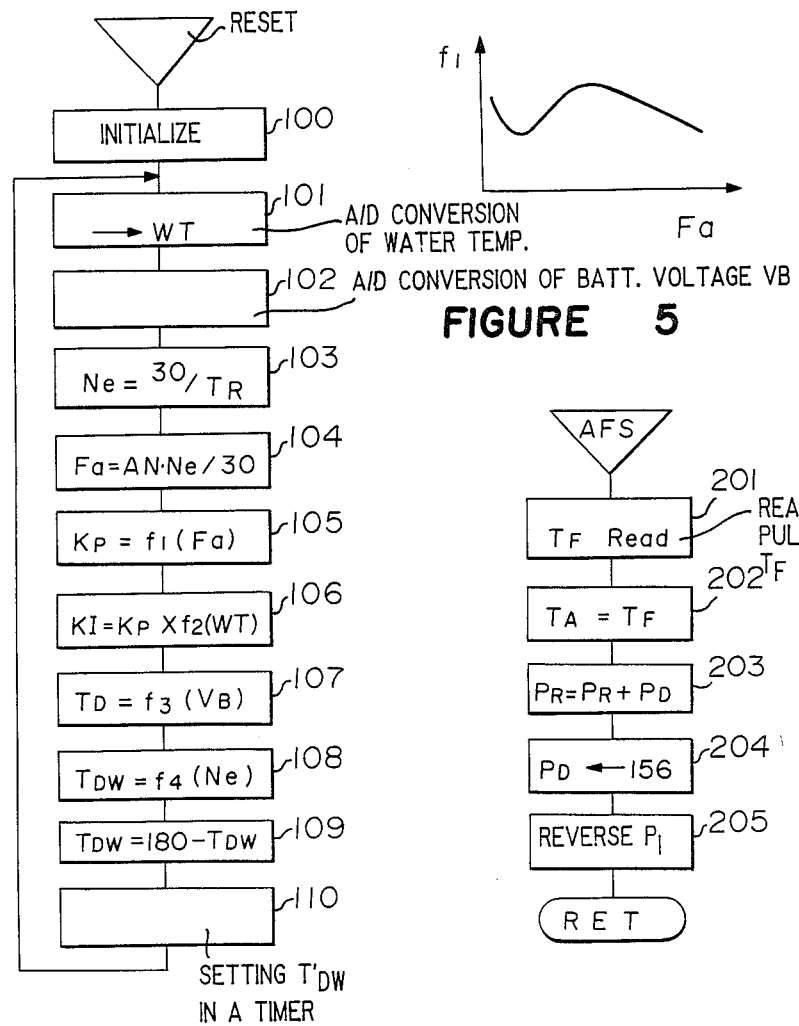
FIGS. 3, 5 and 6 are flow charts showing the operations of the ignition timing control system for the internal combustion engine, according to one embodiment of the present invention.
Figure 4:
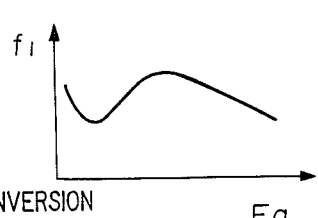
FIG. 4 is a graphical representation showing a relationship between an output frequency of the AFS and a basic drive time conversion coefficient.

In the following, explanations will be given as to the operations of the CPU 40 in reference to the flow charts shown in FIGS. 3, 5 and 6. First of all, FIG. 3 shows the main program of the CPU 40, wherein, when a reset signal is introduced as an input into the CPU 40, the RAM 42, input/output ports, etc. are initialized at the Step 100. Then, at the Step 101, an output from the water temperature sensor 18 is A/D-converted and is stored in the RAm 42 as water temperature WT. At the Step 102, the battery voltage is A/D-converted and is stored in the RAM 42 as battery voltage VB. At the Step 103, calculation of $30/T_R$ is carried out on the basis of the period $T_R$ of the crank angle sensor 17 to thereby obtain the number of revolution $N_e$. At the Step 104, calculation of $AN.N_e/30$ is effected on the basis of a load data AN to be described later and the number of revolution $N_e$, from which an output frequency $F_a$ of the AFS 13 id calculated. At the Step 105, a basic drive time conversion coefficient $K_p$ is calculated on the basis of $f_1$ as shown in FIG. 4, which has been established with respect to the output frequency $F_a$. At the Step 106, the conversion coefficient $K_p$ is corrected by the water temperature data WT, which is then stored in the RAM 42 as a drive time conversion coefficient $K_I$. At the Step 107, a data table $f_e$, which has been stored in advance in the ROM 41 is mapped, from the battery voltage data VB, on the basis of which waste time $T_D$ is calculated and stored in the RAM 42. At the Step 108, the conduction angle $T_{DW}$ of the ignition coil 19 is calculated from the number of revolution $N_e$, and at the Step 109, $T'_{DW} = 180 - T_{DW}$ is calculated. The value of $T'_{DW}$ as calculated is then set in the timer 46 at the Step 110. After the processing at the Step 110, the operation returns to the Step 101 to repeat the same sequence operations.

Figure 5:
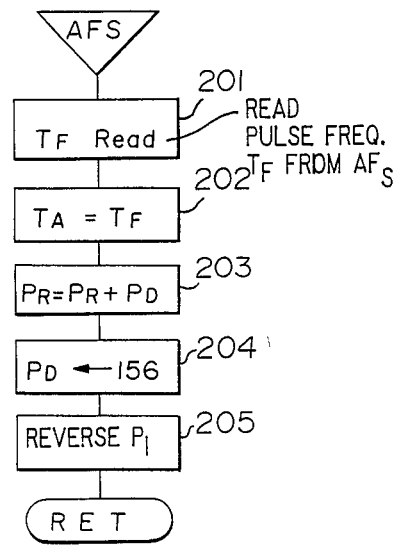

FIG. 5 indicates the interruption input P3, that is, the interruption processing with respect to the output signal from the AFS 13. At the Step 201, an output $T_F$ from the counter 33 is detected to clear the counter 33. This output $T_F$ denotes a period between risings of output signal from the gate 32. At the Step 202, the period $T_F$ is stored in the RAM 42 as an output pulse period $T_A$ of the AFS 13. At the Step 203, remaining pulse data $P_D$ is added to accumulated pulse data $P_R$ to obtain a newly accumulated pulse data $P_R$. The accumulated pulse data $P_R$ is for accumulating the output pulse number of the AFS 13 to be produced during a period between the risings of output signal from the crank angle sensor 17, which is treated by multiplying 156 with respect to 1 pulse of the AFS 13 for the convenience in the processing. At the Step 204, a value 156 is set in the remaining pulse data $P_D$, and, at the Step 205, the output P1 is reversed to complete the interruption processing thereby.

Figure 6:
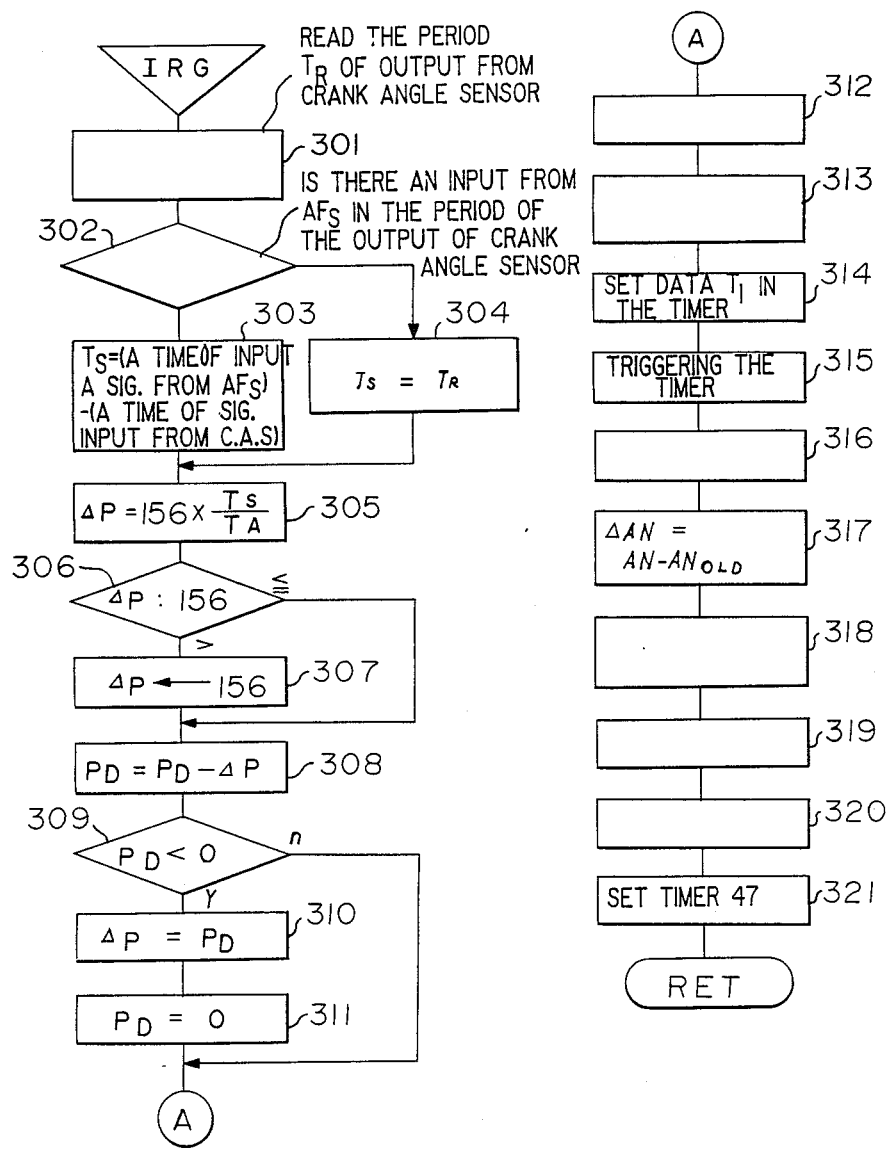

FIG. 6 indicates the interruption processing in the case of the interruption signal being generated in the interruption input P4 of the CPU 40 due to the output from the crank angle sensor 17. At the Step 301, a period between the risings of the output signal from the crank angle sensor 17 is read from the counter 37, which is stored in the RAM 42 as the period $T_R$, thereby clearing the counter 37. At the Step 302, when an output pulse from AFS 13 is present in the period $T_R$, a time difference $\Delta t = t_{02} - t_{01}$ between a time $t_{01}$ of the output from the AFS 13 immediately before the output pulse and an interruption time $t_{02}$ of the crank angle sensor 17 at this time is calculated at the Step 303, and this calculated value is made a period $T_s$. When no output pulse from the AFS 13 is present in the period $T_R$, the period $T_R$ is made the period $T_s$ at the Step 304. At the Step 305, a time difference $\Delta T$ is converted to the output pulse data $\Delta P$ from the AFS 13 by calculation of $156 \times T_s/T_A$. In other words, the pulse data $\Delta P$ is calculated on the assumption that the output pulse period from the AFS 13 at the previous time is identical with the output pulse period from the AFS 13 at this time. At the Step 306, if the pulse data $\Delta P$ is smaller than 156, the operational sequence goes to the Step 308, and when the pulse data is greater than 156, the pulse data $\Delta P$ is clipped on 156 at the Step 307. At the Step 308, the pulse data $\Delta P$ is subtracted from the remaining pulse data $P_D$ to obtain a new remaining pulse data $P_D$. At the Step 309, if the remaining pulse data $P_D$ is positive, the operational sequence proceeds to the Step 312, and, in other case, the pulse data $\Delta P$ is made identical with the remaining pulse data $P_D$ at the Step 310, because the calculated value of the pulse data $\Delta P$ is excessively larger than the output pulse from the AFS 13, and the remaining pulse data is thus rendered zero at the Step 311. At the Step 312, the pulse data $\Delta P$ is added to the accumulated pulse data $P_R$, and the pulse number A/N (or AN) which is considered to have been outputted from the AFS 13 during the rising of the output signal from the crank angle sensor 17 at this time.

At the Step 313, the drive time data $T_I = An \cdot K_I + T_D$ is calculated from the load data AN, the drive time conversion coefficient $K_I$, and the waste time $T_D$. At the Step 314, the drive time data $T_I$ is set in the timer 43. At the Step 315. The four injectors 14 are simultaneously actuated depending on the data $T_I$ by triggering of the timer 43. At the Step 316, the number of revolution $N_e$ is calculated from the crank angle period $T_R$. At the Step 317, a changing rate $\Delta AN$ is found. At the Step 318, a product obtained by multiplying a constant K on AN is added to AN to thereby find out $AN_s$. At the step 319, $AN_s$ is clipped between $\beta_1$ and $\beta_2$. At the Step 320, the ignition timing A is found from both $AN_s$ and $N_e$ by mapping them on the data table $f_5$ shown in FIG. 9, which is stored in advance in the ROM 41. At the Step 321, the result obtained in the previous step is set in the timer 47 to thereby complete the interruption processing.

FIGS. 7(a) to 7(b) indicate various timings at the frequency dividing flag clearing of the processing shown in FIGS. 3, 5 and 6, wherein FIG. 7(a) shows an output from the frequency divider 31l FIG. 7(b) shows an output from the crank angle sensor 17; FIG. 7(c) shows the remaining pulse data $P_D$ which is set in 156 at every rising and trailing (the rising of the output pulse from the AFS 13) of the frequency divider 31, and is changed to the calculated result of, for example, $P_{Di} = P_D - 156 \times T_s/T_A$ at every rising of the output signal from the crank angle sensor 17; and FIG. 7(d) shows the change in the accumulated pulse data $P_R$, which indicates a mode where the remaining pulse data $P_D$ is accumulated at every rising or trailing of the output from the frequency divider 31.

FIGS. 10(a) to 10(e) indicate the operating waveforms for each of the parameters at the transition of the engine operation. For example, at the time of the speed acceleration, the throttle valve increases its degree of opening, in accompaniment of which the boosting pressure (suction pipe pressure) also increases, hence A/N also increases. However, owing to delay in the arithmetic operations as well as detection errors in the AFS 13, the values are determined smaller than the actual values as indicated by the dot lines. Accordingly, while the ignition timing becomes deviated to the side of the advance angle, the ignition timing in this embodiment is rectified to the correct value as shown by the dot line in FIG. 10(e), because $\Delta AN$ is added to AN. By the way, since a relationship of $\Delta AN = 0$ is established outside the transition of the engine operation, no correction of AN is effected in this instance.

As mentioned in the foregoing, according to the first embodiment of the present invention, since the air intake quantity AN per one suction is determined with difference from the actual value at the transition of the engine operation such as its speed acceleration, speed reduction, and others, such difference in the air intake quantity is made to be corrected, whereby the ignition timing of the engine can be accurately controlled even at the transition of the engine operation.

FIG. 11 is a schematic structural diagram showing the second embodiment of the ignition timing control system according to the present invention. In the drawing, the same reference numerals as those in FIG. 1 designate the identical or corresponding parts, and explanations thereof will be dispensed with.

In FIG. 11, a reference numeral 50 designates an AN operating means inclusive of smoothing means and correcting means. This AN operating means 50 performs the same calculation as in the previous equation (5) with an output from the AN detecting means 20, and calculates the pulse numbers equal to the output from the AFS 13, which correspond to an air quantity which the engine 1 is supposed to take in. In other words, it performs smoothing of the intake air quantity A/N. It also performs further correction after this smoothing operation. A reference numeral 51 denotes a control means which controls drive time of the injectors 14 in accordance with the air quantity which the engine 1 takes thereinto and electric conduction in the ignition coil 19 by an output from the AN operating means 50, an output from the water temperature sensor 18 (for example, a thermister) for detecting temperature of the cooling water in the engine 1, and an output from the crank angle sensor 17 for detecting the number of revolution of the engine 1, thereby regulating a quantity of the fuel to be into the engine 1.

A hardware for this control device corresponding to the AN detecting means 20, the AN operating means 50 and the control means 51 is the same as the control device designated by a reference numeral 30 in FIG. 2. Also, as for the operations of the CPU 40 which is the constituent element of the control device 30, explanations for the main program (Steps 100 to 110) in FIG. 3, the interruption routine (Steps 201 to 205) in FIG. 5, and the waveform diagrams in FIG. 8 would apply as they are.

Concerning the interruption processing, in case the interruption signal is generated in the interruption input terminal P4 of the CPU 40 by an output from the crank angle sensor 17, the same sequential operations as in the Step 301 to 311 in FIG. 6 are carried out in the Steps 401 to 411 in FIG. 12. In this second embodiment of the present invention, therefore, explanations will be given on the Step 412 onward.

At the Step 412, the pulse data $\Delta P$ is added to the accumulated pulse data $P_R$ to obtain thereby a newly accumulated pulse data $P_R$. Tjhis data $P_R$ corresponds to the pulse number which the AFS 13 is supposed to have produced as an output therefrom during the rising of the output signal from the crank angle sensor 17 at this time. At the Step 413, a calculation corresponding to the equation (5) is carried out: that is to say, calculation of $K_I AN + (1 - K_I) P_R$ is done on the basis of the load data AN and the accumulated pulse data $P_R$ which have been calculated just before the previous rising of the output signal from the crank angle sensor 17, the result of which is made a new load data AN at this time. At the Step 414, when this load data AN is greater than a predetermined value $\alpha$, the data is clipped on $\alpha$ at the Step 415 so that the load data AN does not become much greaer than the actual value even at the full opening of the engine 1. At the Step 416, the accumulated pulse data $P_R$ is cleared. At the Step 417, the drive time data $T_1 = AN \cdot K_1 + T_D$ is calculated from the load data AN, the drive time conversion coefficient $K_1$ and the waste time $T_D$. At the Step 418, the drive time data $T_1$ is set in the timer 43. At the Step 419, the four injectors 14 are simultaneously actuated in accordance with the data $T_1$ by triggering of the timer 43. At the Step 420, the number of revolution $N_e$ is calculated from the above-mentioned $T_R$. At the Step 421, a deviation (changing rate) $\Delta AN$ between the previous value of AN and the current value of AN is found. At the Step 422, $\Delta AN$ is added to the current value of AN to find outr $AN_s$. At the Step 423, the value of $AN_s$ is clipped between $\beta_1$ and $\beta_2$. At the Step 424, the ignition timing A is found from the $AN_s$ and $N_e$ by mapping them on the data table $f_5$ shown in FIG. 13, which has been stored in advance in the ROM 41, the result of which is set in the timer 47 at the Step 425, thereby completing the interruption processing.

The operating waveforms for each of the parameters at the transition of the engine operation as shown in FIG. 10, which has been used for explanations of the first embodiment of the ignition control system according to the present invention, can also be obtained in this second embodiment.

As mentioned in the foregoing, according to the second embodiment of the present invention, the intake air quantity A/N per one suction of the engine is detected by the AN detecting means, after this A/N value is smoothed by use of the smoothing means, followed by correcting the same to find out accurate A/N value to thereby control the ignition timing based on this A/N value and the engine revolution; hence it is possible to rectify deviation of the A/N value from the actual value at the transition of the engine operation to perform accurate control of the ignition timing.

In the following, explanations will be made as to the third embodiment of the ignition timing control system according to the present invention. FIG. 14 is a schematic diagram showing the ignition timing control system according to the third embodiment of the present invention. The construction of this control system is the same as that of the first embodiment shown in FIG. 1, with the exception that a sensor 52 for detecting an opening degree of a throttle valve is electrically connected between the throttle valve 12 and the correcting means 24. Accordingly, those parts which are identical with, or similar to, those in FIG. 1 are designated by the same reference numerals, and the explanations for them are dispensed with.

The opening-degree sensor 52 is for detecting a degree of opening of the throttle valve 12, while the correcting means 24 is for correcting asn output from the AN detecting means 20 in accordance with an output from the opening-degree sensor 52.

FIG. 15 shows a more detailed construction of the ignition timing control system according to this third embodiment of the present invention. The control system shown in this figure of drawing is the same as the first embodiment which ahs been explained above with reference to FIG. 2, with the exception that it is so constructed as to introducing an output from the opening-degree sensor 52 as an input into the CPU 40 through an interface 53 and an A/D converter 54.

The operations of the ignition timing control system of this embodiment, concerning the interruption processing with respect to the main program and an output signal from the AFS 13, are the same as those of the previous embodiment which has already been explained in reference to FIGS. 3 and 5.

FIG. 16 shows the interruption processing at every 10 m sec. based on the timer 38 with respect to an output signal from the opening-degree sensor 52. At the Step 501, an output $\theta$ from the opening-degree sensor 52 is A/D-converted. At the Step 502, a deviation between the previous value and the current value is calculated and stored. At the Step 503, the current value is stored in place of the previous value to thereby complete the interruption processing.

FIG. 17 shows the interruption processing in case an interruption signal is generated in the interruption input terminal P4 of the CPU 40 by an output from the crank angle sensor 17. In this figure of drawing, the Step 601 through 616 are the same as the Steps 301 through 316 in FIG. 6, hence explanations thereof are dispensed with.

At the Step 617, a product obtained by multiplying a constant $K_s$ on the above-mentioned $\Delta\theta$ is added to AN to find out $AN_s$. At the Step 618, the value $AN_s$ is clipped between $\beta_1$ and $\beta_2$. At the Step 619, the ignition timing A is found from the values $AN_s$ and $N_e$ by mapping them on the data table $f_5$ shown in the above-mentioned FIG. 9, which has been stored in advance in the ROM 41. At the Step 620, the result is set in the timer 47 to complete the interruption processing.

Figure 7:
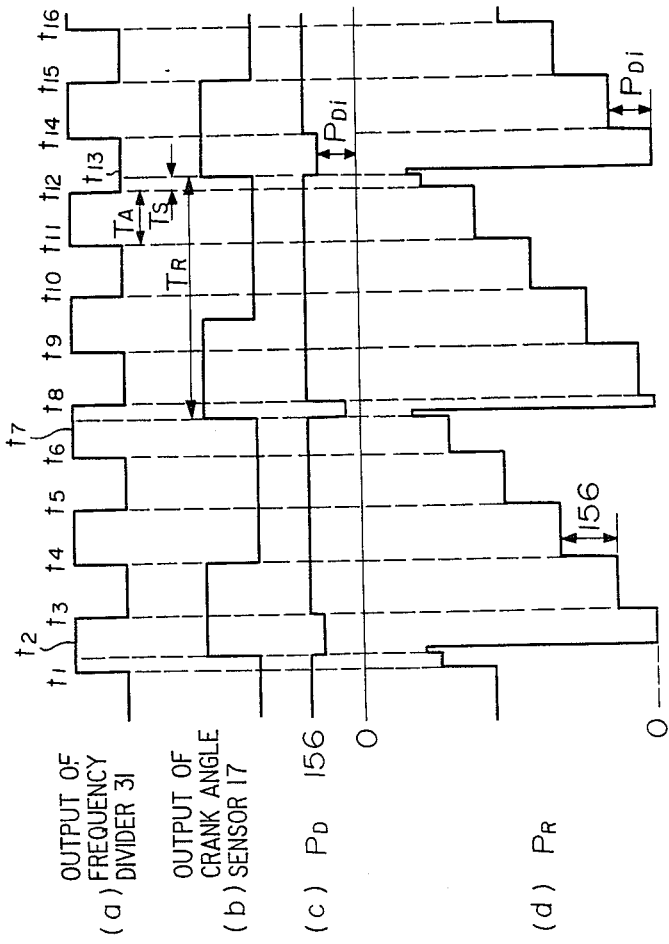
FIG. 7 is a timing chart showing various timings in the flow charts shown in FIGS. 5 and 6.

In the above-described third embodiment of the present invention, there can be realized the operating waveforms as shown in FIGS. 7 and 8, which have been obtained from the operations of the control system according to the first embodiment of the present invention.

FIGS. 18(a) to 18(e) indicate the operating waveforms for each of the parameters at the transition of the engine operation. For example, at the time of the speed acceleration, the throttle valve increases its degree of opening, in accompaniment of which the boosting pressure (suction pipe pressure) also increases, hence the output deviation (changing rate) of the opening-degree sensor 24 and the A/N also increase. However, owing to delay in the arithmetic operations as well as detection errors in the AFS 13, the values are determined smaller than the actual values as indicated by the dot lines. Accordingly, while the ignition timing becomes shifted to the side of the advance angle, the value of AN is rectified to the correct one and the ignition timing becomes also rectified to the appropriate one, because, in this embodiment, a product obtained by multiplying the constant $K_s$ on $\Delta\theta$ is added to AN. By the way, at the time of the speed reduction, $\Delta\theta$ takes a negative value, while AN still takes a correct value as shown by the dot line. Further, in other occasion than the transition period, $\Delta\theta$ becomes zero, so that no correction is effected.

As mentioned in the foregoing, according to this third embodiment of the present invention, since the air intake quantity AN per single suction is determined with a difference from the actual value at the transition of the engine operation such as the speed acceleration, the speed reduction, and so forth, such differences in the air intake quantity is corrected in accordance with an output change in the throttle-valve-opening-degree sensor, whereby the ignition timing of the sensor can be accurately controlled even at the transition of the engine operation.

FIG. 19 is a schematic structural diagram showing the fourth embodiment of the ignition timing control system according to the present invention. In this figure of drawing, the same reference numerals as those in FIGS. 1, 11 and 14 designate the identical or corresponding parts, hence explanations for them will be dispensed with.

The characteristic point of this fourth embodiment of the present invention as shown in FIG. 19 resides in providing the opening-degree sensor 52 for detecting a degree of opening of the throttle valve 12 and the AN operating means including the the smoothing means and the correcting means. This AN operating means carries out the same computation as in the previous equation (5) with an output from the AN detecting means 20, and counts the pulse numbers equal to the output from the AFS 13 which corresponds to an air quantity which the engine 1 is supported to take thereinto. In other words, it performs smoothing of the intake air quantity A/N, after which it carries out correcting operations in accordance with an output from the opening-degree sensor 52. Also, the control means 51 controls drive time of the injectors 14 in correspondence to the air quantity which the engine 1 takes into it and electric conduction in the ignition coil 19 by an output from the AN operating means 50, an output from the water temperature sensor 18 (for example, a thermister) for detecting temperature of the cooling water in the engine 1, and an output from the crank angle sensor 17 for detecting the number of revolution of the engine 1, thereby regulating a quantity of the fuel to be fed into the engine 1.

The control device corresponding to the AN detecting means 20, the AN operating means 50 and the control means 51 in FIG. 19 has the same construction as that of the control device 30 in FIG. 15. Also, as for the operations of the CPU 40 in this control device 30, the explanations for the main program (Steps 100 to 110) in FIG. 3, the interruption routine (Steps 201 to 205) in FIG. 5, and the interruption routine (Steps 501 to 503) in FIG. 16 would apply as they are.

FIG. 20 shows the interruption processing in case an interruption signal is generated in the interruption input terminal P4 of the CPU 40 by an output from the crank angle sensor 17. In FIG. 20, the Steps 701 through 720 are the same as the Steps 401 through 402shown in FIG. 12, hence explanations thereof are dispensed with.

A changing rate $\Delta AN$ of a value AN is found. Then, at the Step 721, a product obtained by multiplying a constant $K_s$ on the above-mentioned $\Delta \theta$ is added to AN to find out $AN_s$. At the Step 722, the value $AN_s$ is clipped between $\beta_1$ and $\beta_2$. At the Step 723, the ignition timing A is found from the values $AN_s$ and $N_e$ by mapping them on the data table $f_5$ shown in FIG. 12, which has been stored in advance in the ROM 41. At the Step 724, the result is set in the timer 47 to complete the interruption processing.

The operating waveforms for each of the parameters at the transition of the engine operation in this fourth embodiment are the same as that of FIG. 18 concerning the third embodiment.

As mentioned in the foregoing, according to this fourth embodiment of the present invention, the intake air quantity A/N per single suction of the engine is detected by the AN detecting means, and, after this value of A/N is smoothed by use of the smoothing means, an accurate value of A/N is found by correcting this smoothed value in accordance with the output from the opening-degree sensor. Based on this A/N value and the engine revolution, the ignition timing can be controlled accurately.

In the afore-described first through fourth embodiments, the output pulse from the AFS 13 during the rising of the output from the crank angle sensor 17 is counted. However, this counting may also be done during its trailing. Further, the output pulse number from the AFS 13 may be counted during several periods of the output from the crank angle sensor 17. Furthermore, while the output pulse number per se from the AFS 13 has been counted, it is also feasible to count a product obtained by multiplying a constant corresponding to the output frequency of the AFS 13 on the output pulse number.

Although, in the foregoing, the present invention has been described in detail with reference to the prefered embodiments thereof, it should be understood that these embodiments are merely illustrative and not so restrictive, and that any changes and modifications in the construction of the ignition timing control system may be by those persons skilled in the art without departing from the spirit and scope of the invention as recited in the appended claims.

What is claimed is:

1. Ignition timing control system which comprises in combination: intake air quantity detecting means for detecting a quantity of the air taken into an internal combustion engine; engine revolution detecting means for detecting number of revolution of the engine; AN detecting means for calculating an output from said intake air quantity detecting means between predetermined crank angles; correcting means for correcting an output from said engine revolution detecting means at the transition of the engine revolution; and control means for controlling the ignition timing of the engine based on the outputs from said engine revolution detecting means and said correcting means.

2. Ignition timing control system according to claim 1, further comprising smoothing means which smoothes an output from said AN detecting means and forwards the smoothed output signal to said correcting means.

3. Ignition timing control system according to claim 1, further comprising an opening-degree sensor for detecting a degree of opening of a throttle valve which regulates an intake quantity of the engine, wherein said correcting means corrects an output from said AN detecting means in accordance with an output from said AN detecting means in accordance with an output from said opening-degree sensor.

4. Ignition timing control system according to claim 3, wherein an output from said AN detecting means is smoothed by said smoothing means, and the smoothed output is forwarded to said correcting means.

5. Ignition timing control system according to claim 1, wherein said correcting means corrects an output from said AN detecting means on the basis of a changing rate thereof.

* * * * *